(12) United States Patent
Blaunstein

(10) Patent No.: US 6,246,964 B1
(45) Date of Patent: Jun. 12, 2001

(54) METHOD OF EARTHQUAKE PREDICTION

(76) Inventor: Nathan Blaunstein, P.O. Box 15075, Beer Sheva 84105 (IL)

( * ) Notice: Subject to any disclaimer, the term of this patent is extended or adjusted under 35 U.S.C. 154(b) by 0 days.

(21) Appl. No.: 09/380,073

(22) PCT Filed: Feb. 24, 1998

(86) PCT No.: PCT/IL98/00088
  § 371 Date: Aug. 25, 1999
  § 102(e) Date: Aug. 25, 1999

(87) PCT Pub. No.: WO98/38532
  PCT Pub. Date: Sep. 3, 1998

(30) Foreign Application Priority Data

Feb. 26, 1997 (IL) ............................................ 120328

(51) Int. Cl.⁷ ................................................... G01V 1/28
(52) U.S. Cl. ........................................................ 702/15
(58) Field of Search ............................................ 702/15

(56) References Cited

U.S. PATENT DOCUMENTS

| 3,191,174 | 6/1965 | Heisler et al. . | |
|---|---|---|---|
| 4,797,677 | 1/1989 | Mac Doran et al. . | |
| 6,018,244 | * 1/2000 | Kushida | 324/323 |

FOREIGN PATENT DOCUMENTS

| 105991 | 11/1993 | (IL) . | |
|---|---|---|---|
| WO96/31789 | * 10/1996 | (WO) | 324/323 |

OTHER PUBLICATIONS

Blaunstein, N., "Evolution of a Stratified Plasma Structure Induced by Local Heating of the Ionosphere", *J. Atmospheric and Solar–Terrestrial Physics*, 59(3): 351–361, 1997.

Blaunstein et al, "Radiophysical Methods of Investigation of Anomalous Effects in the ionosphere During Seismic Events Preparation", XXIV Gen. Assemb. Internl. Union of Radio Science, Kyoto, Japan, 1993.

Chiba, J., "Signal Processing of Gravitational Field Detector for Prediction of Large Seismic Waves", Proc. IEEE, Oct., 1993, pp. 215–218.

Philipp et al, "Power of $H_E$–Scatter Signals" Proc. XII Union Conf. Radiowave Propagation, Kharkov, USSR, 1978, pp. 407–411.

* cited by examiner

*Primary Examiner*—Donald E. McElheny, Jr.
(74) *Attorney, Agent, or Firm*—Mark M. Friedman

(57) ABSTRACT

A method of predicting an earthquake in a seismically active region below an inosphere, including the steps of measuring (10, 12) a relative fluctuation of plasma density (26) in the inosphere (20), inferring a relative amplitude of an acousto-gravity wave in the inosphere (20), and inferring an earthquake magnitude from the relative amplitude of the acousto-gravity wave.

20 Claims, 3 Drawing Sheets

METHOD OF EARTHQUAKE PREDICTION

FIELD AND BACKGROUND OF THE INVENTION

The present invention relates to a method for predicting earthquakes.

Large earthquakes are among the most destructive of natural disasters. The toll that these disasters have taken in both lives and property is well known and need not be recited here. Many methods have been proposed in the past for predicting earthquakes, to provide enough warning for the people affected to prepare. One geophysical method, for example, based on the gravitational field turbulence associated with a seismic event, was proposed by Chiba (Jiro Chiba, *Proceedings of The Institute of Electrical And Electronic Engineers*, 1993 *International Carnahan Conference on Security Technology*, pp. 215–218). Another geophysical method, based on measurements of natural low frequency radio signals, was proposed by Hayakawa (M. Hayakawa, *Phys. Earth. and Plan. Int.*, vol. 77 pp. 127–135 (1993)). These methods provide only about 20 seconds advance notice of an earthquake.

There is thus a widely recognized need for, and it would be highly advantageous to have, a method for predicting earthquakes that provides more advance warning than known methods.

SUMMARY OF THE INVENTION

According to the present invention there is provided a method of predicting an earthquake in a seismically active region below an ionosphere, comprising the steps of: (a) measuring a relative fluctuation of plasma density in the ionosphere; (b) inferring a relative amplitude of an acoustic-gravity wave in the ionosphere; and (c) inferring an earthquake magnitude from the relative amplitude of the acoustic-gravity wave.

The present invention is based on the discovery of an earthquake precursor that appears in the ionosphere above the epicenter several hours before the earthquake. FIGS. 1A through 1F show two way travel times of reflections from the ionosphere, as a function of frequency, measured by a vertical ionosonde, in the 24 hours before an earthquake that occurred in the Vrancha region of Romania on May 30–31, 1990. FIG. 1A shows the structure of the normal ionosphere, 24 hours before the earthquake. Only one reflecting layer is present, and it reflects only at frequencies up to about 15 MHz. As the time of the earthquake approaches, more reflecting layers develop, and they reflect over a wider range of frequencies. Because the reflection frequency is proportional to the square root of the ion density, this wider range of frequencies indicates that the ionosphere becomes more inhomogeneous above the epicenter in the 12 to 16 hours before the earthquake. These inhomogeneities are believed to be produced by acoustic-gravity waves (AGW) associated with the buildup of strain in the Earth's crust immediately before the earthquake.

This phenomenon provides up to 20 hours warning in advance of an earthquake, but it does not provide a measure of the magnitude of the impending earthquake. According to the present invention, a measure of the magnitude of the earthquake is provided by measurements of oblique scattering of radio waves from the ionospheric inhomogeneities. These measurements are interpreted using a theory of the coupling of AGW and ionospheric plasma density that is presented herein.

BRIEF DESCRIPTION OF THE DRAWINGS

The invention is herein described, by way of example only, with reference to the accompanying drawings, wherein.

MODULATION OF PLASMA DENSITY BY ACOUSTIC-GRAVITY WAVES

Figure 1A:
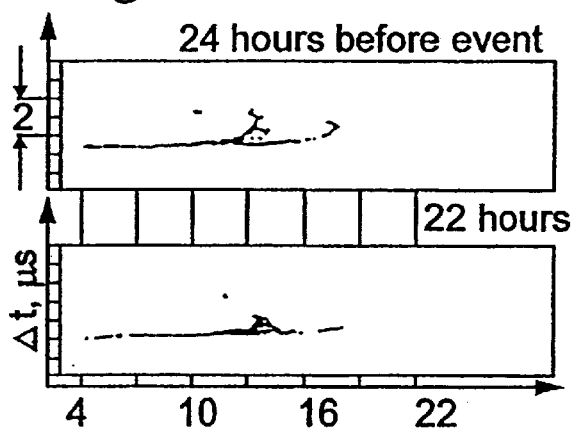
FIGS. 1A through 1F show reflections from the ionosphere, as a function of frequency, at 2 hour decrements in the 24 hours before an earthquake.

During its movement through the ionospheric cold dense plasma, an AGW of frequency $\omega$ and wavenumber vector $\vec{k}$ causes the neutral particle density $N_m$ and the rate of ionization per unit volume $q(\vec{r})$ to vary as follows:

$$N_m = N_{m0} + \delta N_m \exp[i(\vec{k} \cdot \vec{r} - \omega t)] \quad (1)$$

$$q(\vec{r}) = q_0 + \delta q \exp[i(\vec{k} \cdot \vec{r} - \omega t)] \quad (2)$$

(A. Gossard and Y. Huk, *Waves in the Atmosphere*, 1975). Here, $\delta N_m$ and $\delta q$ are the disturbances of neutral particle density and of the rate of ionization per unit volume due to the AGW, $\vec{r}$ is the position vector, and t is time. Let us now estimate the changes in plasma concentration caused by the AGW. Here we must consider two cases, the electrostatic case and the electrodynamic case.

In the D-layer and lower E-layer, the problem is electrostatic. At these altitudes, the ionization rate is as in equation (2), but the recombination rate is of the form $\alpha_{ef} N_e^2$, where $\alpha_{ef}$ is the recombination coefficient, on the order of $0.2 \times 10^{-6}$ cm$^3$s$^{-1}$ to $10^{-6}$ cm$^3$s$^{-1}$. At these altitudes (50–100 km) ions move with the speed of neutral particles, $V^i \approx V^m \approx 50$–100 m/s, and the speed of charged particles is less than the speed of the AGW. In other words, the charged particle motion has no influence on the change of plasma concentration, i.e., $V^i << V_A$, where $V_A$ is the speed of sound. In this case, from the equation of conservation of particles, $$\frac{\partial N}{\partial t} = q - \alpha_{ef} N^2 - div(N\vec{V}_\alpha) \quad (3)$$

it follows that the characteristic time of change of particle density due to recombination, $\tau_R$, is much less than the characteristic time of particle transport, $\tau_T$. In fact, for $N_{e0} = N_{i0} = N_0 = 10^{10}$m$^{-3}$, $V_m \approx 50$ m/s and the characteristic scale of quasiregular plasma inhomogeneity $\Lambda \approx 200$ km at these altitudes, we obtain $\tau_R = (\alpha_{ef} N)^{-1} \approx 100$ s–500 s and $\tau_T = \Lambda/V^m \approx 4000$ s. With $\tau_T << \tau_R$, we can ignore the movement of charged particles in (3), i.e., $$\frac{\partial N}{\partial t} = q - \alpha_{ef} N^2 \quad (3a)$$

Introducing (2) to (3a) and linearizing, we find that the amplitude of plasma inhomogeneities due to AGW can be estimated as:

$$\delta N_{e,i} = N_{e,i} - N_{0e,i} \approx \delta q 2\alpha_{ef} \frac{N_{0e,i}}{\omega^2 + (2\alpha_{ef} N_{0e,i})^2} \quad (4)$$

Here, $q_0 = \alpha_{ef} N_{0e}^2$ ($N_{0e} \approx N_{0i}$, plasma is quasi-neutral), $\delta q = q_0 \delta N_m / N_{m0} = q_0 \delta_A$, where $\delta_A$ is the relative amplitude of the AGW. Using this notation, we finally have:

$$\delta N_{e,i} = \delta_A 2\alpha_{ef} \frac{N_{0e,i}^3}{\omega^2 + (2\alpha_{ef} N_{0e,i})^2} \quad (5)$$

for AGW with frequency $\omega < 2\alpha_{ef}N_0$, $\delta N/N_0 = \delta_A/2$. Hence, for lower frequencies, the plasma disturbances are proportional to their source, i.e., to the amplitude of the AGW. For higher frequencies, i.e., $\omega > 2\alpha ef N_0$, $\delta N/N_0 = 2\delta_A F(\omega)$, where $F(\omega) = (\alpha_{ef} N_0/\omega)^2$. Because in the D-layer and the lower E-layer, $\alpha_{ef} N_0 = 0.002$ s$^{-1}$–$0.01$ s$<<\omega$, $F(\omega)<<1$, and $\delta N/N_0 <<\delta_A$. Hence, for high frequencies, plasma disturbances are weak, i.e., much less than the amplitude of the AGW.

In the F-layer, the problem is electrodynamic. For these altitudes, the amplitude of the moving plasma inhomogeneities depends on the orientation of the wave vector $\vec{k}$ of the AGW relative to the geomagnetic field $\vec{B}_0$ and relative to the plasma drift velocity $\vec{V}_d$. As was shown in C. O. Hines, *Can. J. Phys.* Vol. 38 pp. 1441–1481 (1960), the amplitude of moving plasma disturbances (MPD) is maximal when the condition of spatial resonance is "working" (i.e., the plasma drift velocity is equal to the AGW phase velocity):

$$\omega = \vec{k} \cdot \vec{V}_d \quad (6)$$

The MPD are created by the transport processes during interactions of charged particles with neutrals. The latter are modulated according to equation (1) by the AGW, so the charged particles also are modulated by the AGW. Because at these altitudes (>150 km) magnetic and electric fields are significant, the interaction between the AGW and the plasma is electrodynamic. In this case, because the frequency of ion-neutral interactions, $\nu_{im}$, is on the order of $N_m(T_m+T_i)^{1/2}$, where $T_m$ is the temperature of the neutral species and $T_i$ is the temperature of the ions, the modulation of $N_m$ and $T_m$ by AGW produces a corresponding change in $\nu_{im}$ and hence the corresponding change in the ion velocity $\vec{V}_i$. This modulation of $\vec{V}_i$ causes the redistribution of plasma density and the creation of $\delta N$.

Let us consider that the plasma is isothermal, i.e., $T_e = T_i = T$, which is the case in the lower ionosphere, up to about 200 km, and choose a coordinate system in which the magnetic field $\vec{B}_0$ is parallel to the z-axis. The particle movement is considered in a coordinate system (x,y,z) which is at rest with respect to average neutral flow. The background plasma is quasi-regular and homogeneous. If $\vec{V}_1^m$ is the velocity of neutral species in the field of the AGW, $\vec{k}$ is the wavevector of the AGW, $\delta_A = \delta N_m/N_{m0} = V_1^m/V_{ph}$, where $V_{ph} = \omega/k$ is the phase velocity of the AGW, and $\delta_T = \delta T_m/T_{m0}$ is the relative amplitude of the modulation of the temperature by the AGW, then we can accurately represent the frequency of interaction as a periodic function due to modulation cause by the AGW (D. F. Martin, *Proc. Roy. Soc. Canada*, Vol. A209, p. 216 (1950)):

$$\nu_{im} = \nu_{im}^0[1+(\delta_A+\delta_T/2)\exp\{i(\vec{k}\cdot\vec{r}-\omega t)\}] = \nu_{im}^0 + \delta\nu_{im} \quad (7a)$$

$$\nu_{ei} = \nu_{ei}^0[1+(\delta_i+3\delta_T/2)\exp\{i(\vec{k}\cdot\vec{r}-\omega t)\}] = \nu_{ei}^0 + \delta\nu_{ei} \quad (7a)$$

Because of the difference between $\vec{V}^e$ and $\vec{V}^i$ in the magnetic ($\vec{B}_0$) and electric ($\vec{E}_0$) fields ($E_0 \approx 10$ mV/m–50 mV/m) between particles (electrons and ions), the ambipolar field is created, i.e., $\delta\vec{E} = -\nabla\phi$ ($\phi$ is the potential of the ambipolar field), and also the changes of the tensors of particle mobility:

$$\hat{M}^\alpha = \hat{M}_0^\alpha + \delta\hat{M}^\alpha, \alpha = e, i$$

$$\vec{E} = \vec{E}_0 + \delta\vec{E} \quad (8)$$

where $$\delta\hat{M}^\alpha = \frac{\delta\nu_\alpha}{\nu_\alpha^0}\begin{pmatrix} M_p^\alpha & 0 & 0 \\ 0 & M_p^\alpha & 0 \\ 0 & 0 & -M_\parallel^\alpha \end{pmatrix} \quad (9)$$

Here, p denotes the Pedersen component of electrons ($\alpha = e$) and ions ($\alpha = i$) mobility, i.e., in the direction of the electric field, and $M_\parallel^\alpha$ is the mobility of charged particles along the magnetic field. Finally, in the electrodynamic case, we can present (taking into account that all disturbances are weaker than the background values) in the linear case, the disturbances of charged particle (electrons and ions) velocities (M. G. Gel'berg, *Geom. And Aeron.* Vol. 20, pp. 271–274 (1980)).

$$\delta\vec{V}^\alpha = q\left(\delta\hat{M}^\alpha \vec{E}_0 + \hat{M}_0^\alpha \delta\vec{E}\right) + \frac{B_0}{Q_\alpha}\hat{M}_0^\alpha \delta\vec{V}^m - \frac{D_\alpha B_0}{Q_\alpha}\hat{M}_0^\alpha \nabla\delta\frac{N}{N_0} \quad (10)$$

Here, $D_\alpha$ is the coefficient of diffusion of electrons ($\alpha = e$) or ions ($\alpha = i$); $Q_\alpha = \omega_{H\alpha}/\nu_\alpha$, $\omega_{H\alpha}$ is the gyrofrequency if plasma particles in the magnetic field; $\nu_e = \nu_{em} + \nu_{ei}$; $\nu_i = \nu_{im} + \nu_{ei}$. In the case when disturbances of the plasma particles due to their modulation by the AGW are weak, i.e., $\delta N << N_0$, we can in equation (3) exclude the ambipolar field. Linearizing equation (3) and taking into account equation (10), an equation can be obtained which, for longitudinal AGW, gives $$\frac{\delta N}{N_0} = (\omega - \vec{k}\cdot\vec{V}_d)\frac{\delta_A k V_{ph}\cos^2\chi + (\delta_A + \delta_T/2)\left(\frac{\vec{k}\cdot\vec{E}_0}{Q_i B_o}\right)}{\left(\omega - \vec{k}\cdot\vec{V}_d\right)^2 + (D_\alpha k_\parallel^2)} \quad (11)$$

Here, $\vec{V}_d$ is the drift velocity of charged particles, and $\chi$ is the angle between $\vec{k}$ and $\vec{B}_0$. From (11) it follows that if $Q_i V_{ph}/V_d \cos^2\chi << 1$, then the influence of modulation exceeds the effects of interaction between the plasma and the neutral species. In this case, the angle $\psi = \pi/2 - \chi$ is less than $\psi_k = \sin^{-1}\sqrt{V_d/Q_i V_{ph}}$. For an altitude of 200 km, $Q_i = 10^{-1}$ to $10^{-2}$, $V_{ph} \sim 600$ ms$^{-1}$, $E_0 = 30$ mV/m, and we obtain $\psi_k \sim 7°$ to 20°. Expression (11) has a maximum for AGW satisfying the condition $\omega - \vec{k}\cdot\vec{V}_d \approx D_\alpha k_\parallel^2$, where $k_\parallel$ is the component of $\vec{k}$ parallel to the magnetic field:

$$\left(\frac{\delta N}{N_0}\right)_{max} = \frac{\delta_A k V_{ph}\cos^2\chi + (\delta_A + \delta_T/2)(\vec{k}\cdot\vec{E}_0/Q_i B_0)}{D_\alpha k_\parallel^2} \quad (12)$$

The above analyses illustrate the principal possibility of electrodynamic and electrostatic mechanisms of the redistribution of plasma by longitudinal AGW and, finally, of the creation of plasma inhomogeneities.

DESCRIPTION OF THE PREFERRED EMBODIMENTS

The present invention is of a method of predicting earthquakes as much as 12–16 hours in advance.

The principles and operation of earthquake prediction according to the present invention may be better understood with reference to the drawings and the accompanying description.

The present invention is based on N. D. Philipp and N. Sh. Blaunshtein, Power of $H_E$-Scatter Signals, *Proc. XII Union Conference on Radiowave Propagation, Kharkov*, USSR, 1978, pp. 166–169, which is incorporated by reference for all purposes as if fully set forth herein.

Figure 2:
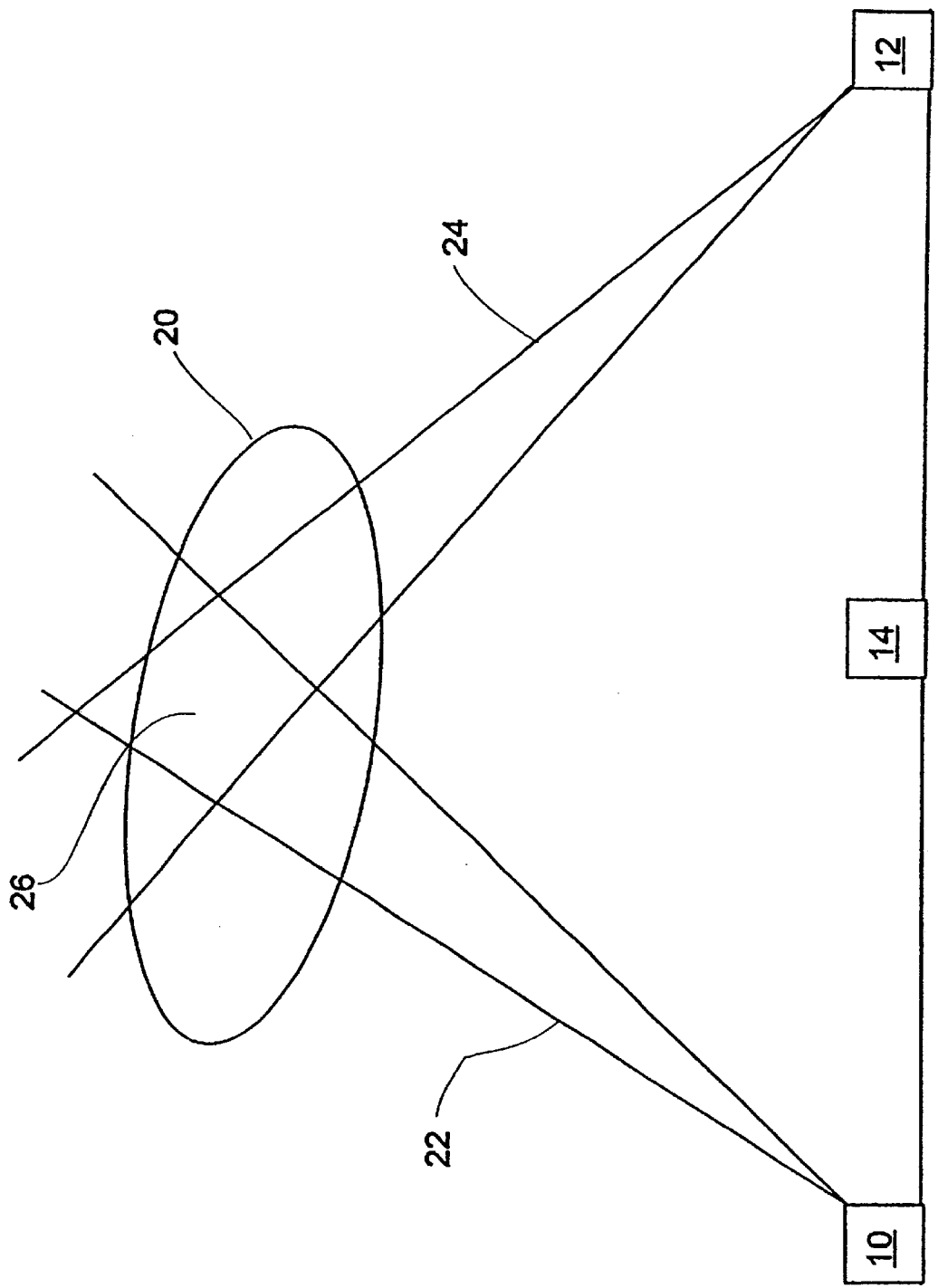
FIG. 2 is a schematic illustration of the measurement geometry of the present invention.

Referring now to the drawings, FIG. 2 illustrates schematically the geometric setup of the apparati used in the present invention. A radio frequency transmitter 10 and a radio frequency receiver 12 are separated by up to 1000 km or more on the surface of the Earth. Together, transmitter 10 and receiver 12 constitute an oblique ionosonde. Transmitter 10 transmits radio frequency energy in a solid angle 22. Receiver 12 receives radio frequency energy from a solid angle 24. In particular, receiver 12 receives radio frequency energy from transmitter 10 that is reflected from anomalous plasma inhomogeneities in the portion of an ionospheric anomaly 20 that lies within the volume of overlap 26 of solid angles 22 and 24. The separation of transmitter 10 and receiver 12 is chosen to be consistent with the elevations of solid angles 22 and 24, the power of transmitter 10 and the sensitivity of receiver 12; the preferred separations are between 500 km and 1000 km. The radio frequency energy should be transmitted at a frequency greater than the ionospheric plasma frequencies, so frequencies greater than about 20 MHz are used.

Figure 1D:
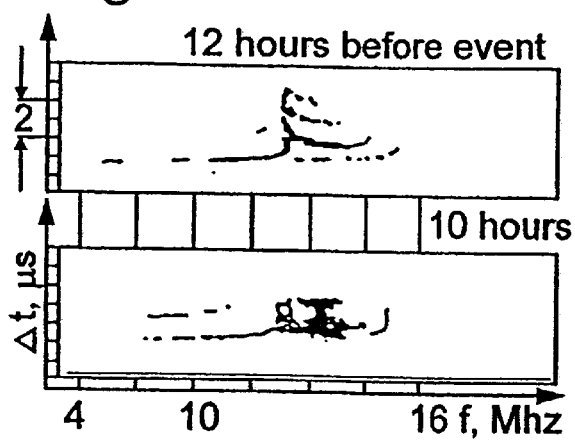
Figure 1B:
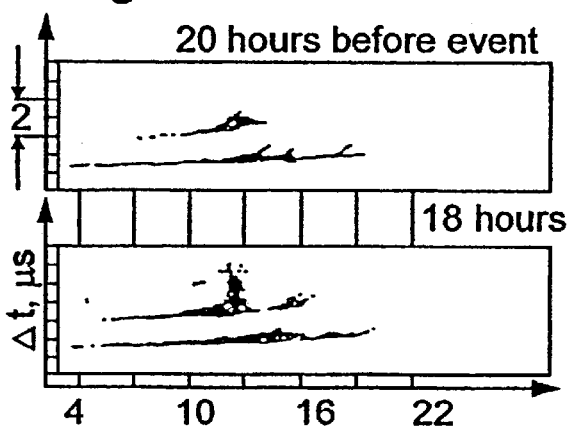
Figure 1E:
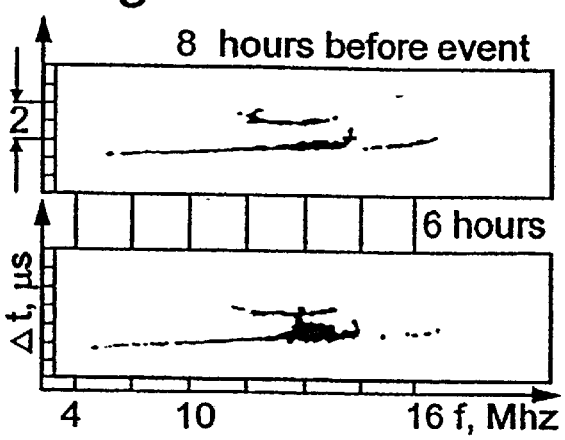
Figure 1C:
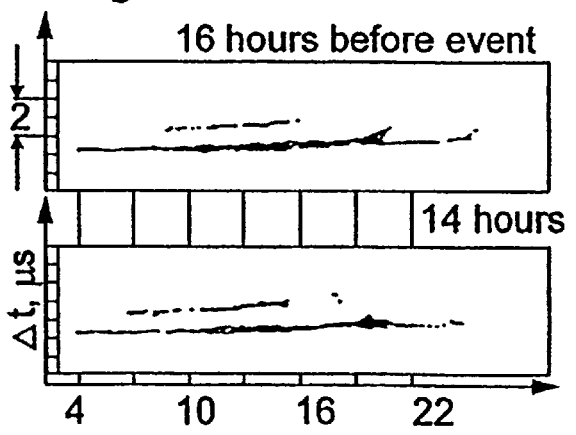
Figure 1F:
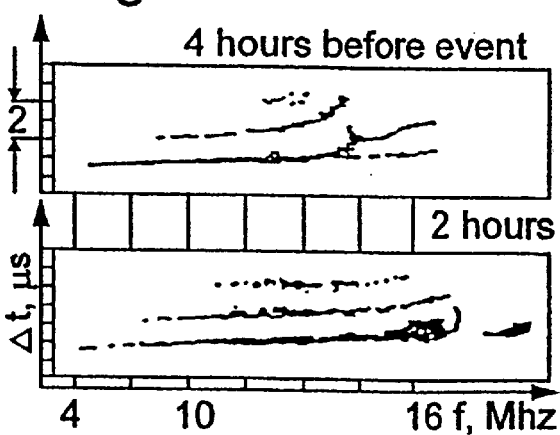

Between transmitter 10 and receiver 12 are deployed one or more vertical ionosondes 14. When an anomalous reflection pattern such as that illustrated in FIG. 1D is detected by one of vertical ionosondes 14, transmitter 10 and receiver 12 are activated to measure the relative fluctuation of plasma density, $\delta N/N_0$, of equation (11), using equation (6) of Philipp and Blaunshtein:

$$P_R = P_T \frac{\alpha \lambda^3 (\delta N/N_0)^2}{32 e \sqrt{2\pi} \, r^4} \int_V \frac{G_T G_R \sin^2}{\sin^2(\theta/2)} \exp\left(-8\pi^2 \alpha^2 \psi^2 \sin^2 \frac{\theta}{2}\right) dV \quad (13)$$

In this equation, $P_T$ is the transmitter power, $P_R$ is the receiver power, r is the distance from transmitter 10 and receiver 12 to overlap volume 26 (if transmitter 10 and receiver 20 are not equidistant from overlap volume 26, the term $r^4$ should be replaced with $r_T^2 r_R^2$, where $r_T$ is the distance from transmitter 10 to overlap volume 26 and $r_R$ is the distance from receiver 12 to overlap volume 26), $\lambda$ is the wavelength of the radio frequency radiation, $G_T$ is the transmitter gain, $G_R$ is the receiver gain, the angles $\theta$, $\psi$ and $\chi$ are defined in Philipp and Blaunshtein, and the integration is performed numerically over overlap volume 26. (The relative fluctuation of plasma density is denoted as $\delta N/N_0$ herein, instead of the notation "$\Delta N/N$" used in Philipp and Blaunshtein.) Note that the latest arrival time measured by vertical ionosonde 14 provides an upper bound on the altitude of anomaly 20, and the integration in equation (13) should be limited to altitudes below this upper bound. $\alpha$ is the ratio L/$\lambda$, where L is the longitudinal extent (along the earth's magnetic field) of the inhomogeneities in anomaly 20. This ratio may be estimated using equation (11) of Philipp and Blaunshtein, as described therein.

Solid angles 22 and 24 are scanned to provide a map of $\delta N/N_0$ in the ionosphere between transmitter 10 and receiver 12. The epicenter of the impending earthquake is predicted to be directly below the point of maximum $\delta N/N_0$, to within about 5 km. $\delta_A$ is estimated using equation (12), on the assumption that $\delta_T$ is much smaller than $\delta_A$. The ionospheric parameters of equation (12), such as wave vector $\vec{k}$, are well known to those ordinarily skilled in the art, and may be found, for example, in M. G. Gel'berg, *The Inhomogeneities of the High-Latitude Ionosphere*, Nauka, Novosibirsk, 1986. To ensure the validity of an analysis based on equation (12), the integration in equation (13) is limited to altitudes at which the electrodynamic model is valid, i.e., above about 80 km. It has been found empirically, for low-magnitude earthquakes, that for earthquakes of magnitude greater than about 3 on the Richter scale, the earthquake magnitude is approximately 0.8 times $\delta_A$. If the predicted magnitude is greater than about 5, the populace near the predicted epicenter is warned to evacuate or take other precautionary measures.

Earthquakes tend to occur in fault zones, which are linear geological features. Therefore, transmitter 10 and receiver 12 preferably are deployed at opposite ends of a fault zone, and are used to probe the ionosphere above the fault zone. For example, to monitor the San Andreas fault of California, transmitter 10 may be deployed in San Diego and receiver 12 may be deployed in San Francisco (or vice versa). In the case of a relatively restricted area of seismic activity, such as the Vrancha Region of Romania, transmitter 10 and receiver 12 may be deployed on opposite sides of the area of seismic activity. In the latter case, it is not necessary to scan solid angles 22 and 24. Instead, solid angles 22 and 24 are kept fixed, and are made wide enough for overlap volume 26 to cover the entire area of seismic activity.

As an alternative to deploying an oblique ionosonde, a sufficiently dense array of vertical ionosondes 14 may be deployed, with each vertical ionosonde 14, in addition to monitoring the reflectivity structure of the ionosphere thereabove, also serving as a combined transmitter and receiver to measure $\delta N/N_0$ in a solid angle directly thereabove. The upper limit of integration for equation (13) is provided by the highest altitude inferred from the maximum two way travel time of the reflection patterns received by vertical ionosondes 14. The lower limit of integration for equation (13) is provided by either the lowest altitude inferred from the minimum two way travel time of the reflection patterns received by vertical ionosondes 14, or by the lowest altitude of validity of the electrodynamic model (~80 km), which ever is higher.

Figure 3:
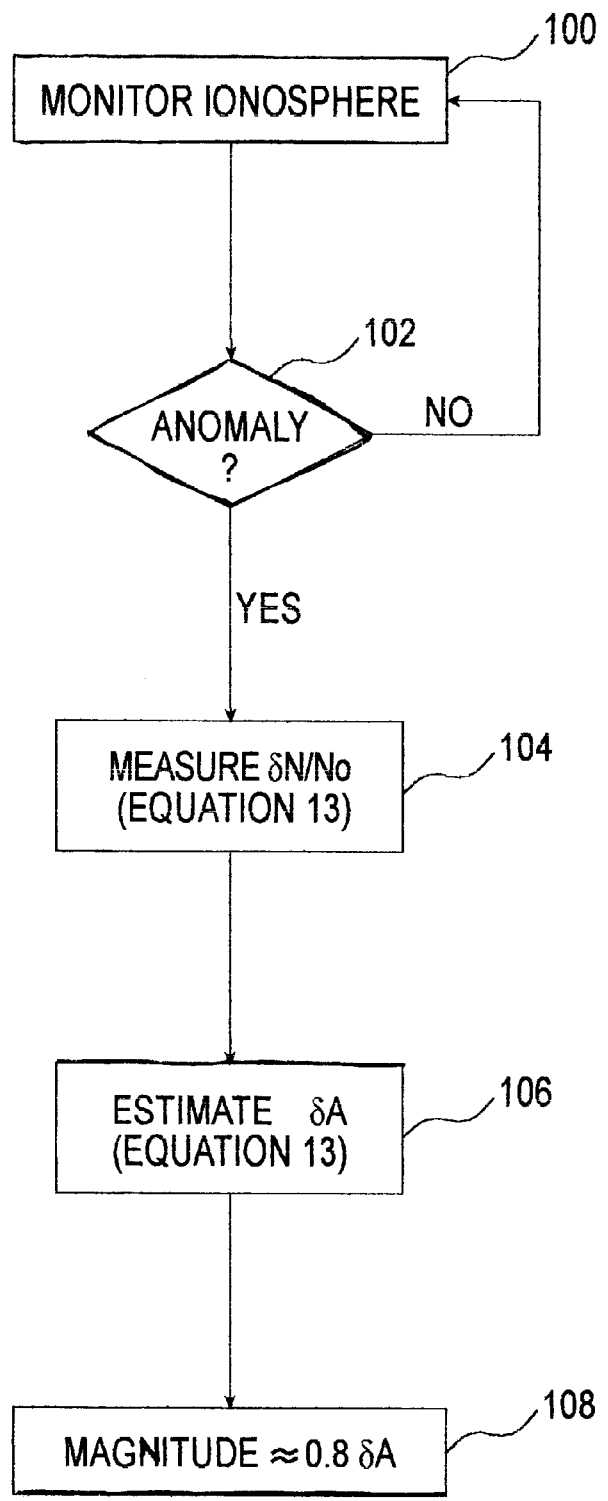
FIG. 3 is a flow chart of the present invention.

FIG. 3 is a flow chart of the present invention. In box 100, vertical ionosondes 14 monitor the reflectivity structure of the ionosphere for anomalies. Upon detection of an anomalous reflection pattern (box 102), transmitter 10 and Receiver 12 are activated to measure $\delta N/N_0$ (box 104). $\delta_A$ is estimated from $\delta N/N_0$ in box 106, and the magnitude of the earthquake is estimated in box 108.

While the invention has been described with respect to a limited number of embodiments, it will be appreciated that many variations, modifications and other applications of the invention may be made.

What is claimed is:

1. A method of predicting an earthquake in a seismically active region below an ionosphere, comprising the steps of:
   (a) measuring a relative fluctuation of plasma density in the ionosphere prior to the earthquake;
   (b) estimating a relative amplitude of an acoustic-gravity wave in the ionosphere from said measured relative fluctuation; and
   (c) estimating an earthquake magnitude from said relative amplitude of said acoustic-gravity wave.

2. The method of claim 1, wherein said measuring of said relative fluctuation of plasma density is effected by scattering radio frequency energy from the ionosphere.

3. The method of claim 2, wherein said radio frequency energy has a frequency greater than about 20 MHz.

4. The method of claim 2, wherein said measuring is effected using a transmitter that transmits said radio frequency energy obliquely in a first solid angle towards the ionosphere and a receiver that receives radio frequency energy obliquely in a second solid angle from the ionosphere, said relative fluctuation of plasma density being measured in an overlap volume defined by said first solid angle and said second solid angle.

5. The method of claim 4, wherein said transmitter and said receiver are separated by between about 500 km and about 1000 km.

6. The method of claim 4, wherein said measuring includes a scanning of at least one solid angle selected from the set consisting of said first solid angle and said second solid angle, the method further comprising the step of:

(d) creating a map of said relative fluctuation of plasma density, said map having a point of maximum relative fluctuation of plasma density, the earthquake being predicted to occur substantially directly below said point of maximum relative fluctuation of plasma density.

7. The method of claim 4, wherein said transmitter and said receiver are deployed at opposite ends of the seismically active region.

8. The method of claim 4, wherein said transmitter and said receiver are deployed outside the seismically active region, with the seismically active region lying between said transmitter and said receiver.

9. The method of claim 1, wherein said measuring of said relative fluctuation of plasma density is effected in a plurality of volumes of the ionosphere, the method further comprising the step of:

(d) creating a map of said relative fluctuation of plasma density, said map having a point of maximum relative fluctuation of plasma density, the earthquake being predicted to occur substantially directly below said point of maximum relative fluctuation of plasma density.

10. The method of claim 9, wherein said measuring of said relative fluctuation of plasma density is effected by scattering radio frequency energy from said volumes, said radio frequency energy being emitted by a transmitter in a first solid angle and being received by a receiver in a second solid angle, said plurality of volumes being defined by said first solid angle and said second solid angle as at least one solid angle selected from the set consisting of said first solid angle and said second solid angle is scanned.

11. The method of claim 10, wherein said radio frequency energy has a frequency greater than about 20 MHz.

12. The method of claim 10, wherein said transmitter and said receiver are separated by between about 500 km and about 1000 km.

13. The method of claim 1, further comprising the step of:

(d) monitoring the ionosphere for an anomalous reflection pattern;

said measuring of said relative fluctuation of plasma density being initiated upon detection of said anomalous reflection pattern.

14. The method of claim 13, wherein said monitoring is effected using a vertical ionosonde.

15. The method of claim 14, wherein said measuring of said relative fluctuation of plasma density is effected by scattering radio frequency energy from said ionosphere, using a transmitter that transmits said radio frequency energy obliquely in a first solid angle towards the ionosphere and a receiver that receives radio frequency energy obliquely in a second solid angle from the ionosphere, said vertical ionosonde being deployed substantially between said transmitter and said receiver.

16. The method of claim 15, wherein said radio frequency energy has a frequency greater than about 20 MHz.

17. The method of claim 15, wherein said transmitter and said receiver are separated by between about 500 km and about 1000 km.

18. The method of claim 13, wherein said monitoring is effected using a plurality of vertical ionosondes.

19. The method of claim 18, wherein each of said reflection patterns detected by each of said plurality of ionosondes has a minimum two way travel time defining a minimum altitude and a maximum two way travel time defining a maximum altitude, and wherein said measuring of said relative fluctuation of plasma density is effected by transmitting radio frequency energy vertically in a solid angle from each of said plurality of ionosondes and receiving said radio frequency in said solid angle by said each of said plurality of ionosondes; for each of said plurality of ionosondes, said solid angle, said maximum altitude, and the greater of said minimum altitude and a lowest altitude of validity of an electrodynamic model defining a volume in the ionosphere, the method further comprising the step of:

(e) creating, from said measurements of said relative fluctuation of plasma density in said volumes, a map of said relative fluctuation of plasma density, said map having a point of maximum relative fluctuation of plasma density, the earthquake being predicted to occur substantially directly below said point of maximum relative fluctuation of plasma density.

20. The method of claim 1, wherein said measuring is effected at least about 12 hours before the earthquake.

* * * * *